US012449875B2

(12) United States Patent
Hsiao et al.

(10) Patent No.: US 12,449,875 B2
(45) Date of Patent: Oct. 21, 2025

(54) POWER MANAGEMENT SYSTEM OF INPUT-OUTPUT MEMORY MANAGEMENT UNIT AND ASSOCIATED METHOD

(71) Applicant: MEDIATEK INC., Hsin-Chu (TW)

(72) Inventors: Chih-Hsiang Hsiao, Hsinchu (TW); Chih-Pin Su, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 99 days.

(21) Appl. No.: 18/241,909

(22) Filed: Sep. 4, 2023

(65) Prior Publication Data

US 2025/0076950 A1    Mar. 6, 2025

(51) Int. Cl.
*G06F 1/28*    (2006.01)
*G06F 1/30*    (2006.01)

(52) U.S. Cl.
CPC . *G06F 1/28* (2013.01); *G06F 1/30* (2013.01)

(58) Field of Classification Search
CPC ..................................... G06F 1/28; G06F 1/30
See application file for complete search history.

(56) References Cited

U.S. PATENT DOCUMENTS

| | | | |
|---|---|---|---|
| 10,955,886 B2 * | 3/2021 | Ragupathi | G06F 9/4893 |
| 11,567,555 B2 * | 1/2023 | Kim | G06F 9/30043 |
| 2007/0006227 A1 * | 1/2007 | Kinney | G06F 9/45558 |
| | | | 718/1 |
| 2007/0112999 A1 * | 5/2007 | Oney | G06F 21/53 |
| | | | 711/6 |
| 2014/0149763 A1 * | 5/2014 | Allen-Ware | G06F 1/3296 |
| | | | 713/320 |
| 2014/0149769 A1 * | 5/2014 | Brock | G06F 1/3296 |
| | | | 713/322 |
| 2016/0179184 A1 * | 6/2016 | Shah | G06F 9/5094 |
| | | | 713/320 |
| 2018/0060123 A1 * | 3/2018 | Weissmann | G06F 9/4806 |
| 2018/0136940 A1 * | 5/2018 | Mallichan | G06F 8/61 |
| 2018/0173553 A1 * | 6/2018 | Warkentin | G06F 9/45558 |
| 2021/0096896 A1 * | 4/2021 | Das | G06F 1/324 |
| 2021/0116955 A1 | 4/2021 | Kim | |
| 2021/0271481 A1 * | 9/2021 | Tian | G06F 13/4221 |
| 2022/0405090 A1 * | 12/2022 | Veluswamy | G06F 8/654 |
| 2023/0043379 A1 * | 2/2023 | Guyer | G06F 11/1446 |
| 2023/0126507 A1 * | 4/2023 | Kim | G11C 16/102 |
| | | | 714/764 |

FOREIGN PATENT DOCUMENTS

| | | |
|---|---|---|
| CN | 114090184 A | 2/2022 |
| TW | 201517438 A | 5/2015 |

* cited by examiner

*Primary Examiner* — Aurel Prifti
(74) *Attorney, Agent, or Firm* — Winston Hsu

(57) ABSTRACT

A power management system includes at least one device, at least one memory management unit (MMU), a processor, and at least one device controller, wherein the at least one MMU corresponds to the at least one device, respectively. The processor is arranged to execute at least one access control power manager, an operating system (OS), and a hypervisor, wherein the OS is arranged to generate a trigger signal, and the hypervisor is arranged to generate a first hint according to the trigger signal. The at least one device controller is arranged to control the at least one access control power manager according to the first hint, to manage at least one power of the at least one MMU.

16 Claims, 5 Drawing Sheets

POWER MANAGEMENT SYSTEM OF INPUT-OUTPUT MEMORY MANAGEMENT UNIT AND ASSOCIATED METHOD

BACKGROUND

The present invention is related to power management, and more particularly, to a power management system that can at least control a life cycle of an input-output memory management unit (IOMMU) and an associated method.

Nowadays, an edge device may utilize a hypervisor for virtualization so that hardware of the edge device and/or software running on the edge device can be in a secure environment. For example, multiple virtual machines (VMs) are generated during the virtualization, and each VM can run its own operating system (OS). Since the VMs are independent of each other, security requirements can be met. In addition, for each independent VM, access control (AC) for a system memory is vital, and the access control can be realized by using a stage-2 MMU (e.g. an IOMMU). For multiple hardware devices on the edge device, each hardware device may access the system memory through a direct memory access (DMA) method, and the IOMMU can ensure that a corresponding device can only access physical addresses allowed to be accessed. In addition, when low power optimization is required, these devices can be powered off. In order to further save power, corresponding IOMMUs can also be powered off. At this moment, life cycle control of the IOMMU is critical.

For a conventional control method, a device manager and an AC manager may run on the OS through software, wherein the device manager may be arranged to control a device power manager to manage the device power, and the AC manager may be arranged to generate a trigger signal for further processing of the IOMMU power. Additionally, another AC manager may run on the hypervisor, wherein the another AC manager may be arranged to control an AC power manager according to the trigger signal, to manage the IOMMU power. Some problems may occur, however. Since the device manager, the AC manager, and the another AC manager are independent of each other, it may cause some security holes (e.g. the power-on/off of the corresponding device is not synchronized with the power-on/off of the IOMMU). For example, under a condition that the IOMMU is powered off, if the device is powered on, the protection mechanism may fail. In addition, since the AC manager and/or the another AC manager may be preempted by other processing, it may cause slow response of the power management. As a result, a novel power management system that can control a life cycle of the IOMMU and/or a life cycle of the corresponding device is urgently needed.

SUMMARY

It is therefore one of the objectives of the present invention to provide a power management system that can control a life cycle of an IOMMU and/or a life cycle of a corresponding device and an associated method, to address the above-mentioned issues.

According to an embodiment of the present invention, a power management system is provided. The power management system comprises at least one device, at least one MMU, a processor, and at least one device controller, wherein the at least one MMU corresponds to the at least one device, respectively. The processor is arranged to execute at least one access control power manager, an OS, and a hypervisor, wherein the OS is arranged to generate a trigger signal, and the hypervisor is arranged to generate a first hint according to the trigger signal. The device controller is arranged to control the at least one access control power manager according to the first hint, to manage at least one power of the at least one MMU.

According to an embodiment of the present invention, a power management method is provided. The power management method comprises: generating, by an OS, a trigger signal; generating, by a hypervisor, a first hint according to the trigger signal; and controlling, by at least one device controller, at least one access control power manager according to the first hint, to manage at least one power of at least one MMU, wherein the at least one MMU corresponds to at least one device, respectively.

One of the benefits of the present invention is that, by the power management system and the associated method of the present invention, a life cycle of an IOMMU and/or a life cycle of a corresponding device can be controlled by a device controller included in the power management system, which can prevent some security holes from happening. For example, under a condition that the corresponding device is powered on, the device controller can prevent the IOMMU from being powered off. In addition, the power management system of the present invention can further include a recovery engine, wherein the recovery engine can perform a recovery operation upon the IOMMU. In this way, the workload of an OS and a hypervisor executed by a processor in the power management system can be decreased, which therefore can improve overall performance.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . .".

Figure 1:
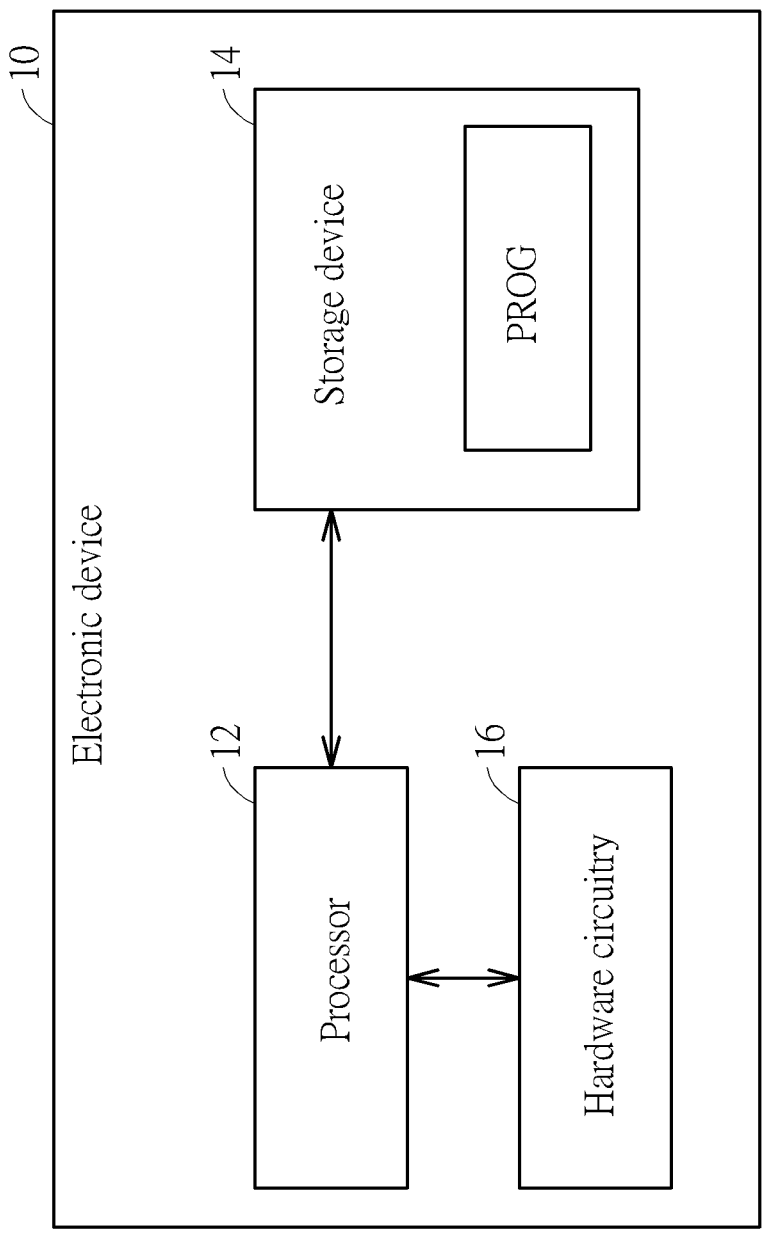
FIG. 1 is a diagram illustrating an electronic device according to an embodiment of the present invention.

FIG. 1 is a diagram illustrating an electronic device 10 according to an embodiment of the present invention. By way of example, but not limitation, the electronic device 10 may be a portable device such as a smartphone or a tablet.

The electronic device 10 may include a processor 12, a storage device 14, and a hardware circuitry 16. The processor 12 may be a single-core processor or a multi-core processor. The storage device 14 is a computer-readable medium, and is arranged to store computer program code PROG. The processor 12 is equipped with software execution capability. The computer program code PROG may include a plurality of software modules. Hence, when loaded and executed by the processor 12, the computer program code PROG instructs the processor 12 to perform designated functions of the software modules. The electronic device 10 may be regarded as a computer system using a computer program product that includes a computer-readable medium containing the computer program code PROG. The hardware circuitry 16 is pure hardware that may consist of logic gates only, and performs designated functions without software execution. Regarding a power management system as proposed by the present invention, it may be embodied on the electronic device 10. For example, the power management system may include software-based functions implemented by computer program code PROG running on the processor 12 and/or hardware-based functions implemented by the hardware circuitry 16.

Figure 2:
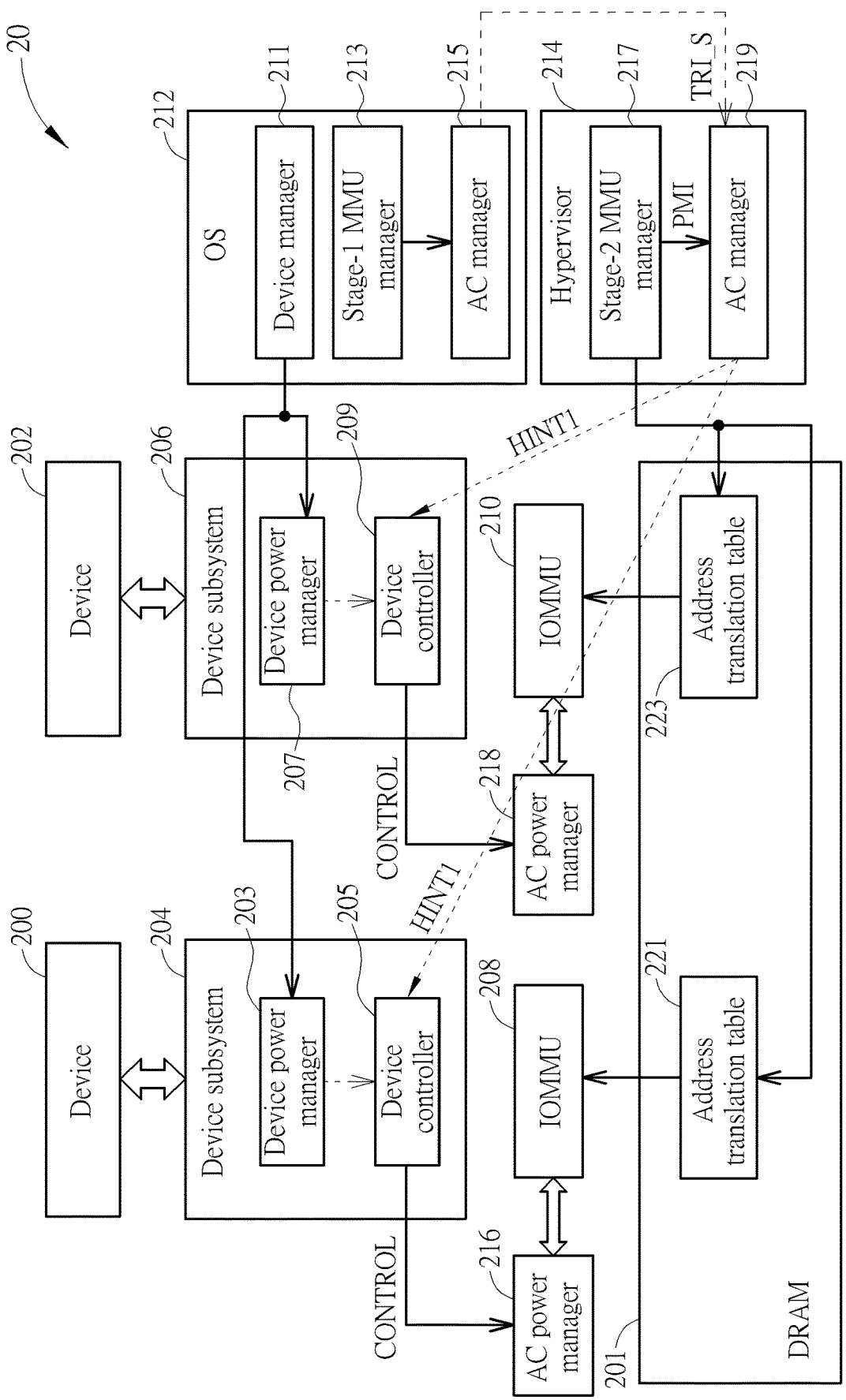
FIG. 2 is a diagram illustrating a power management system according to an embodiment of the present invention.

FIG. 2 is a diagram illustrating a power management system 20 according to an embodiment of the present invention. As shown in FIG. 2, the power management system 20 may include a processor (e.g. the processor 12 shown in FIG. 1), a system memory (a dynamic random access memory (DRAM) 201), at least one device (e.g. devices 200 and 202), at least one device subsystem (e.g. device subsystems 204 and 206), and at least one stage-2 memory management unit (MMU; e.g. at least one input-output MMU (IOMMU), such as IOMMUs 208 and 210), wherein the device 200 corresponds to the device subsystem 204 and the IOMMU 208, and the device 202 corresponds to the device subsystem 206 and the IOMMU 210. Examples of each of the devices 200 and 202 may include, but are not limited to: a memory protection unit (MPU), a graphic processing unit (GPU), and a camera. The device subsystem 204 may include a device power manager 203 and a device controller 205, wherein the device power manager 203 is arranged to manage/control a power of the device 200, and the device controller 205 is arranged to manage a power of the IOMMU 208. Similarly, the device subsystem 206 may include a device power manager 207 and a device controller 209, wherein the device power manager 207 is arranged to manage a power of the device 202, and the device controller 209 is arranged to manage a power of the IOMMU 210. The device subsystems 204 and 206 can be implemented by software, hardware, or a combination of the software and the hardware. In this embodiment, the device power managers 203 and 207 can be implemented by the software, and the device controllers 205 and 209 can be implemented by the hardware, but the present invention is not limited thereto.

The processor may be arranged to execute software modules, including an operating system (OS) 212 running on a guest virtual machine (VM), a hypervisor 214, and multiple access control (AC) power managers 216 and 218, wherein a device manager 211, a stage-1 MMU manager 213, and an AC manager 215 may run on the OS 212, and a stage-2 MMU manager 217 and an AC manager 219 may run on the hypervisor 214. The device manager 211 may be arranged to control the device power managers 203 and 207 to manage the power of the devices 200 and 202, respectively. In addition, powers (more particularly, life cycles) of the device controllers 205 and 209 are also managed by the device power managers 203 and 207 through the control of the device manager 211, respectively. The stage-1 MMU manager 213 may be arranged to manage a stage-1 MMU (not shown in FIG. 1) to perform a first level address translation (e.g. translation between logical addresses and intermediate physical address (IPAs)). When there is a need, the stage-1 MMU manager 213 may notify the AC manager 215 to generate a trigger signal TRI_S to the AC manager 219 for triggering power management of the IOMMUS 208 and 210. After receiving the trigger signal TRI_S, the AC manager 219 may be arranged to receive power management information PMI for the IOMMUs 208 and 210 from the stage-2 MMU manager 217, and generate a hint HINT1 to the device controllers 205 and 209 according to the power management information PMI. In addition, the stage-2 MMU manager 217 may be arranged to generate and store multiple address translation tables 221 and 223 in the DRAM 201, wherein the address translation table 221 corresponds to the IOMMU 208, and the address translation table 223 corresponds to the IOMMU 210. The IOMMUs 208 and 210 may obtain the address translation tables 221 and 223 through accessing the DRAM 201, respectively, to perform a second level address translation (e.g. translation between the IPAs and physical addresses).

The device controller 205 may be arranged to control the AC power manager 216 according to the hint HINT1 (labeled as "CONTROL" in FIG. 2), to manage the power of the IOMMU 208. Similarly, the device controller 209 may be arranged to control the AC power manager 218 according to the hint HINT1 (labeled as "CONTROL" in FIG. 2), to manage the power of the IOMMU 210. In this way, the power management system 20 (more particularly, the device controllers 205 and 209) can control the life cycles of power-on of the IOMMUs 208 and 210 to be larger than or equal to that of the devices 200 and 202, respectively, which can prevent some security holes from happening. For example, under a condition that the devices 200 and 202 are controlled to be powered on, the device controllers 205 and 209 can prevent the IOMMUs 208 and 210 from being powered off, respectively.

Figure 3:
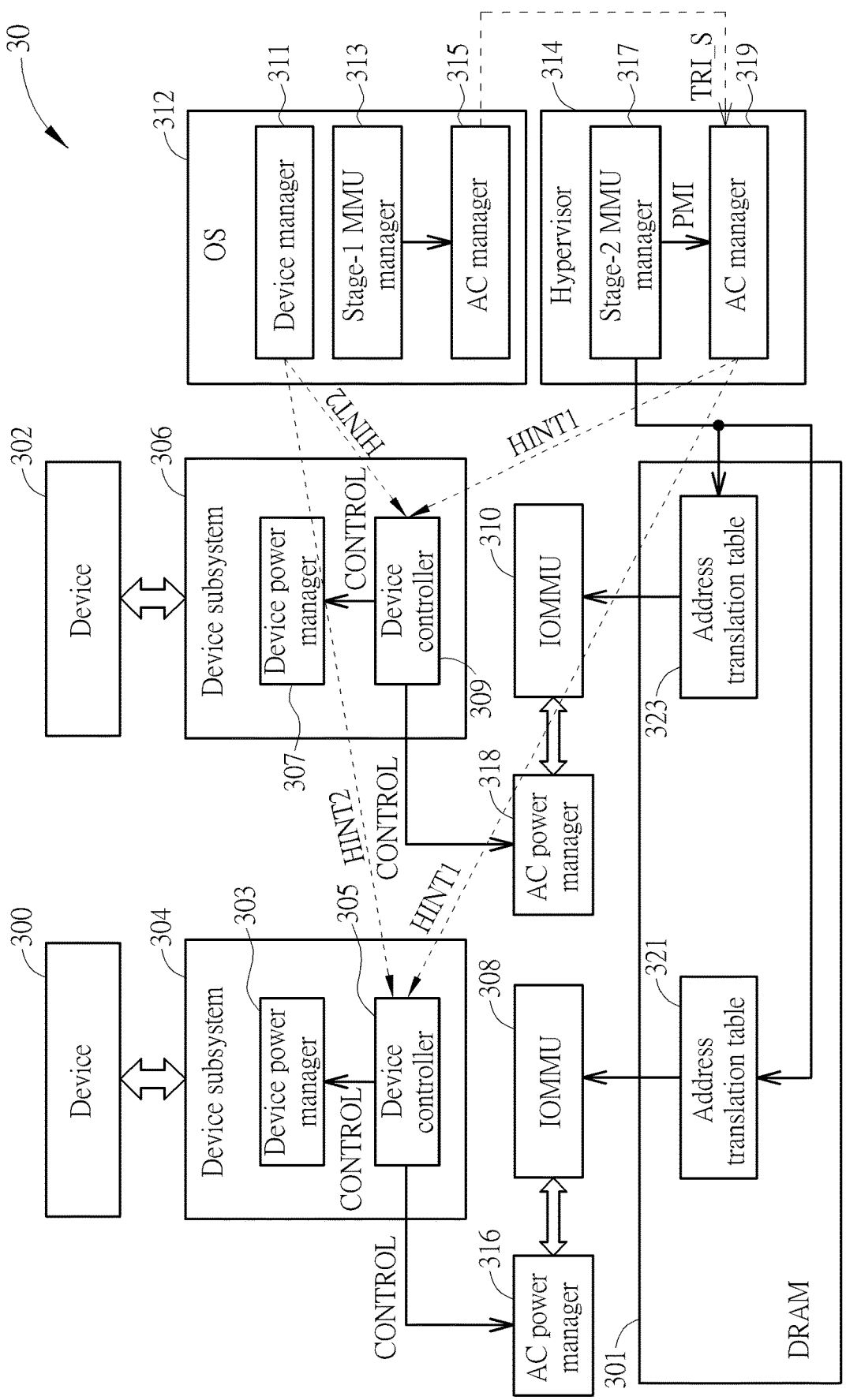
FIG. 3 is a diagram illustrating a power management system according to another embodiment of the present invention.

For advanced design, the device controller in the power management system of the present invention can manage the power of the IOMMU and the power of the device at the same time. FIG. 3 is a diagram illustrating a power management system 30 according to another embodiment of the present invention. As shown in FIG. 3, the power management system 30 may include a processor (e.g. the processor 12 shown in FIG. 1), a system memory (a DRAM 301), at least one device (e.g. devices 300 and 302), at least one device subsystem (e.g. device subsystems 304 and 306), and at least one stage-2 MMU (e.g. at least one IOMMU, such as IOMMUs 308 and 310), wherein the device 300 corresponds to the device subsystem 304 and the IOMMU 308, the device 302 corresponds to the device subsystem 306 and the IOMMU 310, the device subsystem 304 may include a device power manager 303 and a device controller 305, and the device subsystem 306 may include a device power manager 307 and a device controller 309. The processor may be arranged to execute software modules, including an OS 312 running on a guest VM, a hypervisor 314, and multiple AC power manager 316 and 318, wherein a device manager 311, a stage-1 MMU manager 313, and an AC manager 315 may run on the OS 312, and a stage-2 MMU manager 317 and an AC manager 319 may run on the hypervisor 314. In addition, the stage-2 MMU manager 317 may be arranged to generate and store multiple address translation tables 321 and 323 in the DRAM 301, wherein the address translation table 321 corresponds to the IOMMU 308, and the address translation table 323 corresponds to the IOMMU 310.

The difference between the power management system 30 and the power management system 20 shown in FIG. 2 is that, in the power management system 30, the device manager 311 may be modified to generate a hint HINT2 to the device controllers 305 and 309, and the device controllers 305 and 309 may be arranged to control the device power managers 303 and 307 according to the hint HINT2 (labeled as "CONTROL" in FIG. 3), to manage the power of the devices 300 and 302, respectively. In this embodiment, the device controller 305/309 can manage the power of the device 300/302 and the power of the IOMMU 308/310 at the same time, and therefore can ensure the life cycle of power-on of the device 300/302 to be smaller than or equal to that of the IOMMU 308/310. For example, in response to the IOMMU 308/310 being powered off, the device controller 305/309 can prevent the device 300/302 from being powered on. For another example, in response to the device 300/302 being powered on, the device controller 305/309 can prevent the IOMMU 308/310 from being powered off. In this way, the protection mechanism provided by the IOMMU 308/310 can be ensured to be triggered. For brevity, similar descriptions for this embodiment are not repeated in detail here.

After the IOMMU is powered off, its original setting may disappear. As a result, in response to the IOMMU being required to be repowered on, a recovery operation is needed to be performed upon the IOMMU to recover the original setting. For the power management system 20/30, the stage-1 MMU manager 213/313 running on the OS 212/312 and the stage-2 MMU manager 217/317 running on the hypervisor 214/314 are arranged to perform the recovery operation, which may increase the workload of the OS 212/312 and the hypervisor 214/314 and therefore may decrease overall performance. In order to solve this issue, the present invention further provides a power management system including a recovery engine, wherein the recovery engine may be implemented by the hardware.

Figure 4:
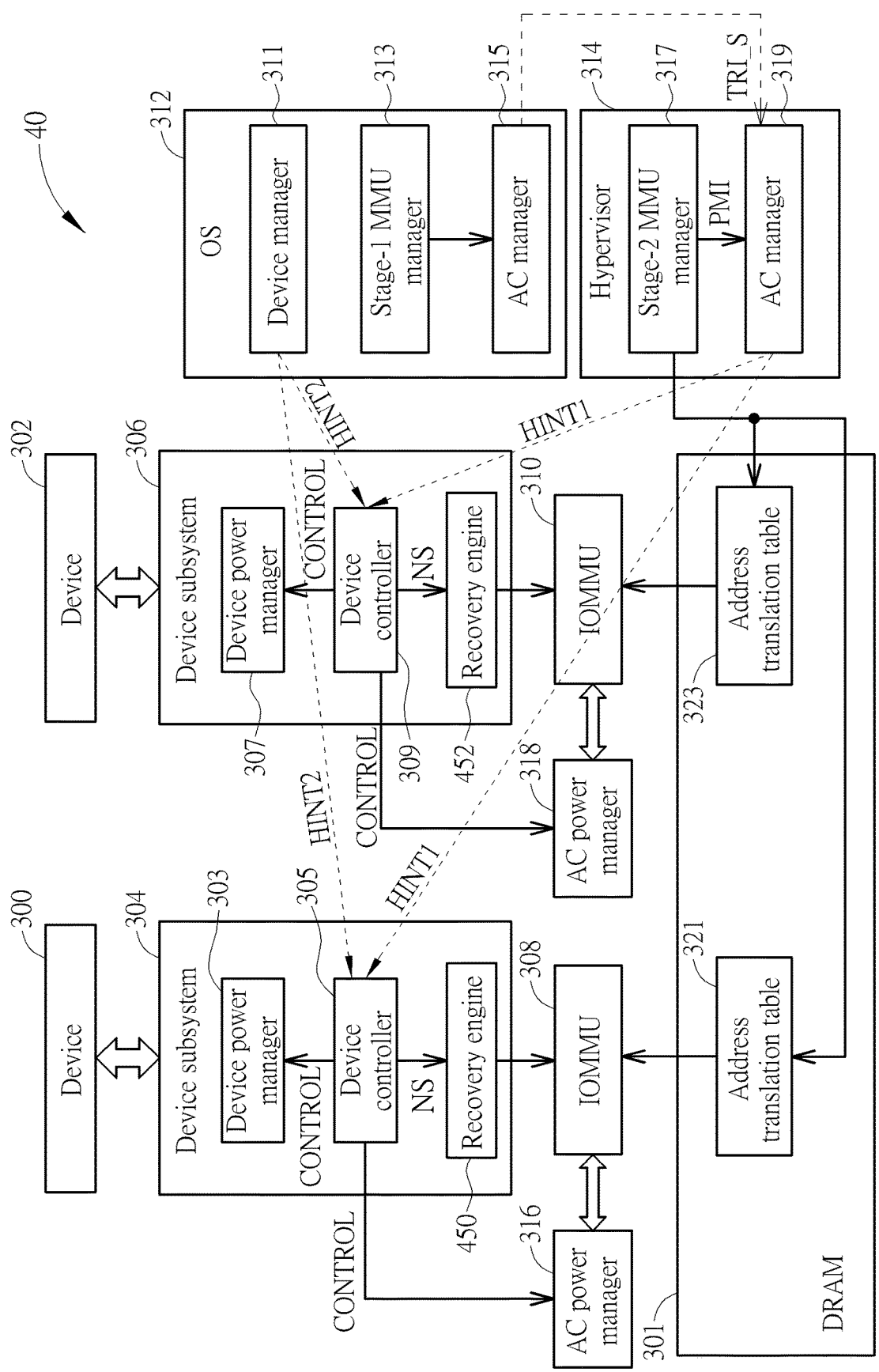
FIG. 4 is a diagram illustrating a power management system according to yet another embodiment of the present invention.

FIG. 4 is a diagram illustrating a power management system 40 according to yet another embodiment of the present invention. As shown in FIG. 4, the difference between the power management system 40 and the power management system 30 shown in FIG. 3 is that, the device subsystems 304 and 306 in the power management system 40 further include a recovery engine 450 and a recovery engine 452, respectively, wherein the recovery engine 450 may be arranged to perform a recovery operation upon the IOMMU 308, and the recovery engine 452 may be arranged to perform a recovery operation upon the IOMMU 310. The hint HINT1 generated by the AC manager 219 may indicate whether to repower on the IOMMU 308/310. As a result, in response to the IOMMU 308/310 being required to be repowered on, the device controller 305/309 may transmit a notifying signal NS to the recovery engine 450/452 for performing the recovery operation. In this way, by sharing the recovery operation through the recovery engine 450/452, the workload of the OS 212/312 and the hypervisor 214/314 can be decreased, which therefore can improve the overall performance.

Figure 5:
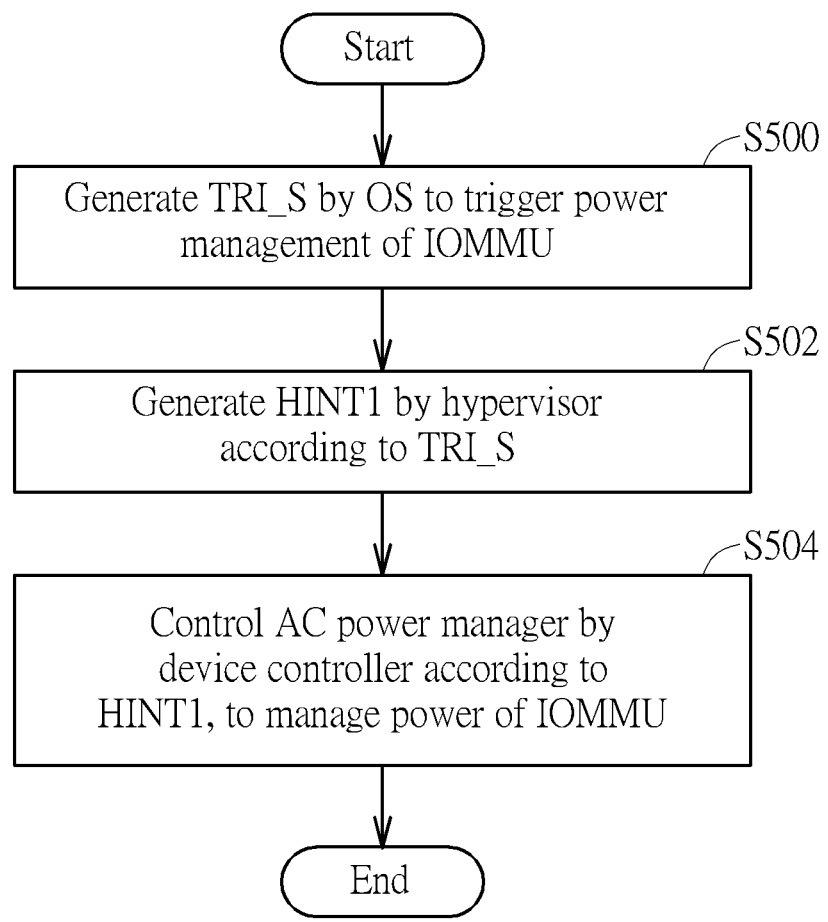
FIG. 5 is a flow chart of a power management method according to an embodiment of the present invention.

FIG. 5 is a flow chart of a power management method according to an embodiment of the present invention. Provided that the result is substantially the same, the steps are not required to be executed in the exact order shown in FIG. 5. For example, the power management method shown in FIG. 5 can be employed by the power management system 20 shown in FIG. 2, the power management system 30 shown in FIG. 3, and/or the power management system 40 shown in FIG. 4.

In Step S500, the trigger signal TRI_S is generated by an OS to trigger power management of an IOMMU.

In Step S502, the hint HINT1 is generated by a hypervisor according to the trigger signal TRI_S.

In Step S504, an AC power manager is controlled by a device controller according to the hint HINT1, to manage the power of the IOMMU.

Since a person skilled in the pertinent art can readily understand details of the steps shown in FIG. 5 after reading the above paragraphs, further description is omitted here for brevity.

In summary, by the power management system and the associated method of the present invention, a life cycle of an IOMMU and/or a life cycle of a corresponding device can be controlled by a device controller included in the power management system, which can prevent some security holes from happening. For example, under a condition that the corresponding device is powered on, the device controller can prevent the IOMMU from being powered off. In addition, the power management system of the present invention can further include a recovery engine, wherein the recovery engine can perform a recovery operation upon the IOMMU. In this way, the workload of an OS and a hypervisor executed by a processor in the power management system can be decreased, which therefore can improve overall performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power management system, comprising:
   at least one device;
   at least one memory management unit (MMU), wherein the at least one MMU corresponds to the at least one device, respectively;
   a processor, arranged to execute:
      at least one access control power manager;
      an operating system (OS), arranged to generate a trigger signal; and
      a hypervisor, arranged to generate a first hint according to the trigger signal;
   at least one device controller, arranged to control the at least one access control power manager according to the first hint, to manage at least one power of the at least one MMU; and
   at least one recovery engine, arranged to perform at least one recovery operation upon the at least one MMU, wherein in response to the at least one MMU being required to be repowered on, the at least one device controller is further arranged to transmit at least one notifying signal to the at least one recovery engine for performing the at least one recovery operation.

2. The power management system of claim 1, wherein the processor is further arranged to execute at least one device power manager, and the OS is further arranged to control the at least one device power manager to manage at least one power of the at least one device.

3. The power management system of claim 2, wherein at least one power of the at least one device controller is managed by the at least one device power manager.

4. The power management system of claim 1, wherein the at least one device controller is further arranged to manage at least one power of the at least one device.

5. The power management system of claim 4, wherein the at least one device controller is further arranged to ensure at least one life cycle of power-on of the at least one device to be smaller than or equal to at least one life cycle of power-on of the at least one MMU.

6. The power management system of claim 5, wherein in response to the at least one MMU being powered off, the at least one device controller is further arranged to prevent the at least one device from being powered on.

7. The power management system of claim 5, wherein in response to the at least one device being powered on, the at least one device controller is further arranged to prevent the at least one MMU from being powered off.

8. The power management system of claim 1, wherein the processor is further arranged to execute at least one device power manager, the OS is further arranged to generate a second hint, and the at least one device controller is further arranged to control the at least one device power manager according to the second hint, to manage at least one power of the at least one device.

9. A power management method, comprising:
generating, by an operating system (OS), a trigger signal;
generating, by a hypervisor, a first hint according to the trigger signal;
controlling, by at least one device controller, at least one access control power manager according to the first hint, to manage at least one power of at least one memory management unit (MMU), wherein the at least one MMU corresponds to at least one device, respectively;
performing, by at least one recovery engine, at least one recovery operation upon the at least one MMU; and
in response to the at least one MMU being required to be repowered on, transmitting, by the at least one device controller, at least one notifying signal to the at least one recovery engine for performing the at least one recovery operation.

10. The power management method of claim 9, further comprising:
controlling, by the OS, at least one device power manager to manage at least one power of the at least one device.

11. The power management method of claim 10, further comprising:
managing, by the at least one device power manager, at least one power of the at least one device controller.

12. The power management method of claim 9, further comprising:
managing, by the at least one device controller, at least one power of the at least one device.

13. The power management method of claim 12, wherein the step of managing, by the at least one device controller, the at least one power of the at least one device comprises:
ensuring at least one life cycle of power-on of the at least one device to be smaller than or equal to at least one life cycle of power-on of the at least one MMU.

14. The power management method of claim 13, wherein the step of ensuring the at least one life cycle of power-on of the at least one device to be smaller than or equal to the at least one life cycle of power-on of the at least one MMU comprises:
in response to the at least one MMU being powered off, preventing the at least one device from being powered on.

15. The power management of claim 13, wherein the step of ensuring the at least one life cycle of power-on of the at least one device to be smaller than or equal to the at least one life cycle of power-on of the at least one MMU comprises:
in response to the at least one device being powered on, preventing the at least one MMU from being powered off.

16. The power management method of claim 9, further comprising:
generating, by the OS, a second hint; and
controlling, by the at least one device controller, at least one device power manager according to the second hint, to manage at least one power of the at least one device.

* * * * *